United States Patent [19]
Garthe et al.

[11] Patent Number: 6,124,960
[45] Date of Patent: Sep. 26, 2000

[54] TRANSMISSION SYSTEM WITH CROSS-PHASE MODULATION COMPENSATION

[75] Inventors: Dietmar Garthe, Herts; Ross Alexander Saunders, Fife; Alan Robinson, Harlow, all of United Kingdom; Maurice O'Sullivan, Ottawa, Canada; Rongqing Hui, Lawrence, Kans.

[73] Assignee: Northern Telecom Limited, Montreal, Canada

[21] Appl. No.: 08/929,360

[22] Filed: Sep. 8, 1997

[51] Int. Cl.$^7$ ...................................................... H04B 10/04
[52] U.S. Cl. .......................... 359/181; 359/124; 359/180; 359/183
[58] Field of Search ...................... 359/180, 181, 359/183, 188, 161, 173

[56] References Cited

U.S. PATENT DOCUMENTS

| | | | |
|---|---|---|---|
| 4,847,477 | 7/1989 | Smith | 250/201 |
| 5,373,382 | 12/1994 | Pirio et al. | 359/161 |
| 5,539,563 | 7/1996 | Park | 359/161 |
| 5,606,445 | 2/1997 | Kikuchi et al. | 359/161 |
| 5,699,179 | 12/1997 | Gopalakrishnan | 359/183 |
| 5,717,510 | 2/1998 | Ishikawa et al. | 359/161 |
| 5,745,613 | 4/1998 | Fukuchi et al. | 385/24 |
| 5,798,853 | 8/1998 | Watanabe | 359/160 |
| 5,963,312 | 10/1999 | Roberts | 356/73.1 |

FOREIGN PATENT DOCUMENTS

| | | |
|---|---|---|
| 0 539 177 | 4/1993 | European Pat. Off. . |
| 2 308 254 | 6/1997 | United Kingdom . |

*Primary Examiner*—Leslie Pascal
*Assistant Examiner*—Hanh Phan
*Attorney, Agent, or Firm*—Lee, Mann, Smith, McWilliams, Sweeney, and Ohlson

[57] ABSTRACT

In a WDM transmission system carrying amplitude modulated traffic in which significant cross-phase modulation occurs, each of the individual channels is pre-chirped at the transmitter with replicas, or low-pass filtered replicas of the amplitude modulation applied to each of the other channels. Prechirping of each individual channel with a replica of the amplitude modulation applied to that channel may be added in order additionally to provide compensation for self-phase modulation.

10 Claims, 13 Drawing Sheets

TRANSMISSION SYSTEM WITH CROSS-PHASE MODULATION COMPENSATION

BACKGROUND OF THE INVENTION

Optical transmission systems for digital transmission of wavelength multiplexed signals over medium and long haul distances can experience several kinds of cross-talk effects. One of these effects is Cross-Phase Modulation. This arises at high signal power levels at which non-linearity effects begin to assume significant proportions and limit system reach. Cross-Phase Modulation arises when the modulation of the optical power in one of the signals being transmitted is large enough to produce a significant corresponding modulation of the refractive index of the transmission medium in which that power is propagating. This index modulation give rise to phase modulation of all the signals being transmitted. Phase modulation of the signal that is producing the index modulation is Self-Phase Modulation (SPM), while phase modulation of all the other signals is Cross-Phase Modulation, XPM.

In a transmission system that uses direct detection the presence of XPM at the detector presents no particular problem because a direct detector is not sensitive to variations in phase of the received signal. XPM is however a problem, even in a transmission system using direct detection, if the transmission medium exhibits dispersion. In the presence of such dispersion, as is for instance exhibited by conventional optical fibre waveguide transmission media handling wavelength multiplexed traffic, the phase modulation produced by XPM is progressively converted into amplitude modulation. Hence the presence of XPM is liable to lead to partial closure of the transmission eye diagram.

SUMMARY OF THE INVENTION

It is an object of the present invention to provide a transmission system in which compensation is provided to cancel out at least a part of the deleterious effects of XPM.

According to the present invention there is provided, in an optical transmission system having a transmitter having at least two optical channels amplitude modulated by associated electrical signals, which amplitude modulated optical signals are wavelength multiplexed on to an optical transmission path including a length of optical fibre exhibiting dispersion, a method of reducing the level of cross-talk appearing at the end of the fibre remote from the transmitter that is engendered by cross-phase modulation of one of the two amplitude modulated channels by the other, which method includes modulating, at the transmitter, the phase of said one amplitude modulated channel with a signal derived from the electrical modulation used to modulate the amplitude of said other amplitude modulated channel.

The invention also provides, in an optical transmission system having a transmitter having at least two optical channels amplitude modulated by associated electrical signals, which amplitude modulated optical signals are wavelength multiplexed on to an optical transmission path included a length of optical fibre exhibiting dispersion, a method of reducing the level of cross-talk appearing at the end of the fibre remote from the transmitter that is engendered by cross-phase modulation of each of the amplitude modulated channels by each of the other channels, which method includes modulating, at the transmitter, the phase of each one of the amplitude modulated channels with signals derived from the electrical modulation used to modulate the amplitude of each of the other amplitude modulated channels.

The invention may be viewed as providing a kind of inverse prechirping of the individually affected channels to counter at least some of the chirping they experience as the result of XPM. In the most simple implementation of a transmission system according to the present invention having two or more spans of optical fibre transmission path concatenated by optical amplifiers, the method of the invention can compensate for the XPM introduced in the first span after the transmitter, but does not compensate for any XPM generated by non-linear effects in the second and subsequent spans as the result of the optical power being boosted by their associated amplifiers. It is however the XPM in the first span that it typically the most serious because there is partial conversion of this XPM into amplitude modulation by the dispersion of the first and all subsequent spans, whereas in respect of XPM generated in the second and subsequent spans there is partial conversion of the XPM into amplitude modulation by dispersion in a progressively more restricted number of spans.

Alternatively stated, the present invention operates by evaluating what phase modulation will be impressed on any given channel, channel A, by XPM induced by data appearing on any other channel, channel B, and then pre-chirping the phase of channel A with a negative replica of that evaluated phase modulation so that the pre-chirping is gradually offset by the phase modulation subsequently generated in channel A as the result of XPM induced by channel B.

Other advantages and features of the invention will be readily apparent from the following description of the preferred embodiments, the drawings and the claims.

DESCRIPTION OF THE PREFERRED EMBODIMENTS

Figure 1:
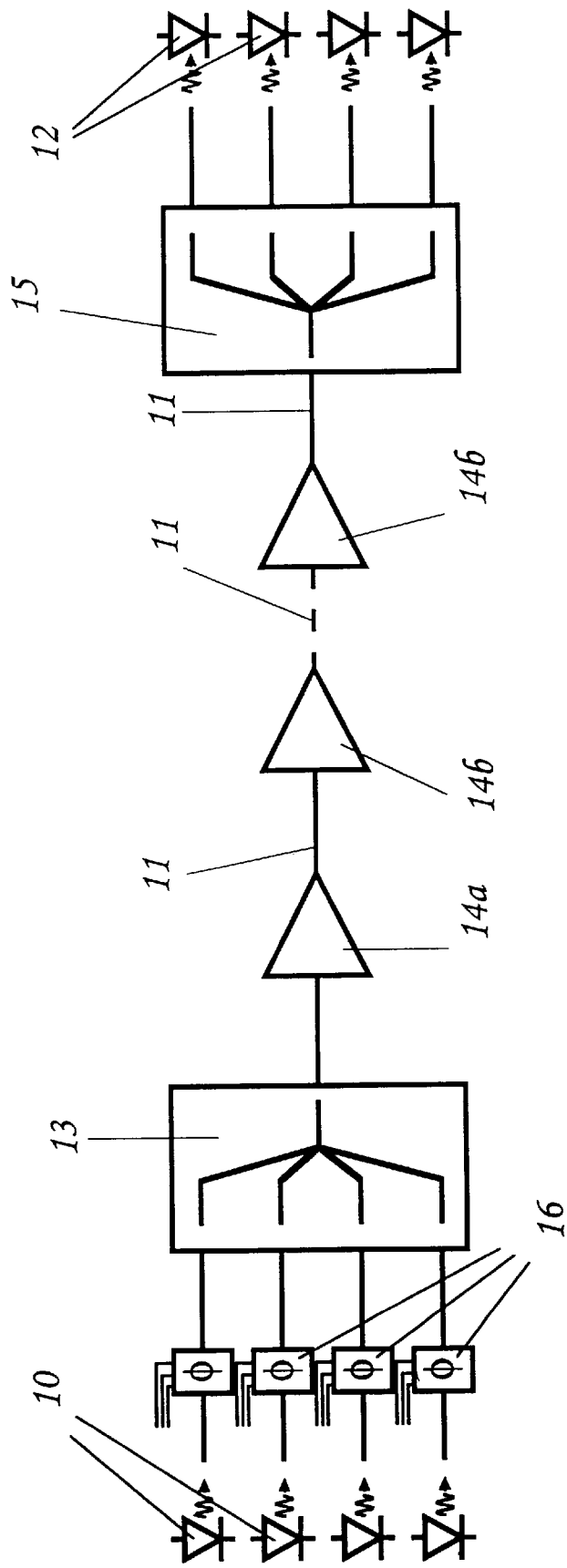
FIG. 1 is a schematic diagram of a transmission system embodying the invention in a preferred form.

Referring to FIG. 1, an example of WDM transmission embodying the present invention has a set of optical transmitters 10 each modulated with a data signal of a different one of the wavelength multiplexed channels of the system. (For illustrative convenience, a system with four WDM channels has been specifically depicted). These transmitters are optically coupled via an optical fibre waveguide transmission highway 11 with a corresponding set of receivers 12. At the transmitter end of the system the individual signal outputs of the optical transmitters 10 are wavelength multiplexed on to the optical highway by means of a multiplexer 13 which may be immediately followed by an optical amplifier 14a. At the receiver end of the system the multiplexed channels are demultiplexed by means of a demultiplexer 15 so that the different wavelength channels may be directed specifically to their respective detectors 12. At intervals along the length of the optical highway 11, there may be one or more additional optical amplifiers 14b. Thus far in the description, the system has not been distinguished from prior art WDM transmission systems. The distinction lies in the presence of phase modulators 16, variable delay devices, each modulating the phase of the emission of its associated transmitter 10 with signals derived from the data applied to each of the other transmitters 10.

Figure 2:
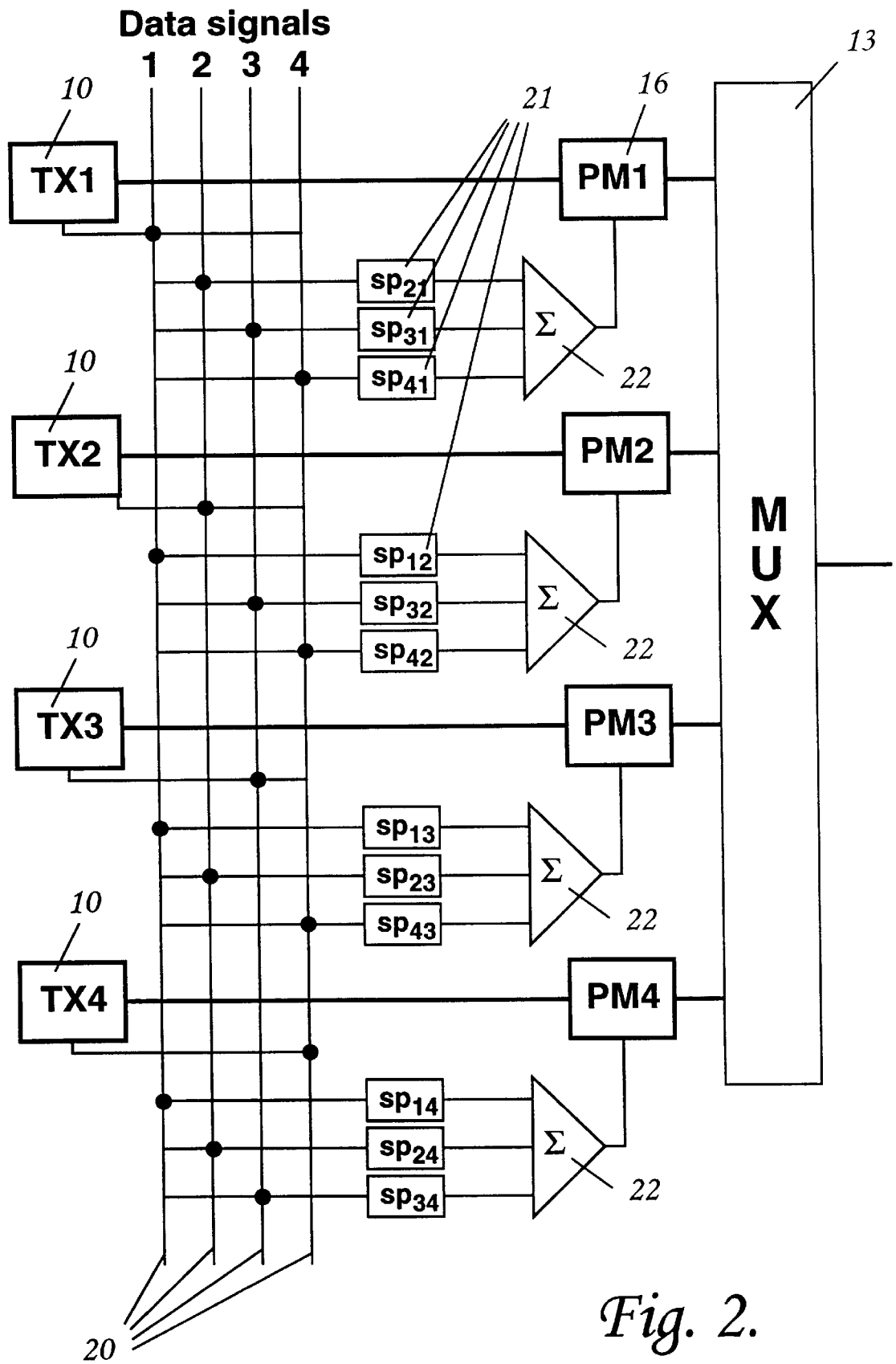
FIG. 2 is a more detailed schematic diagram of the transmitter of the transmission system of FIG. 1.

The arrangement of the transmitters 10 and their phase modulators 15 is shown in greater detail in FIG. 2. Electrical data for the four transmitters 10 is applied over four data buses 20. There is a direct connection from the first data bus 20 to the first transmitter 10 (transmitter 1×1 in FIG. 2) while the associated phase modulator 16 (phase modulator PM1 in FIG. 2) is driven by the outputs of three of a set of signal processors 21, namely signal processors $sp_{21}$, $sp_{31}$, and $sp_{41}$. The three signal processors receive their inputs respectively from the other three data buses, and their outputs are summed in an associated summing amplifier whose output provides the phase control signal applied to the phase modulators PM1. The other three transmitters 10 transmitters TX2, TX3, and TX4, their signal processors 21, summing amplifiers 22 and phase modulators 16 are similarly connected. Thus there is a direct connection from each of the second, third and fourth data buses respectively to the second, third and fourth transmitters TX2, TX3 and TX4. Similarly for each of these transmitters there is an associated set of three signal processors 21 having inputs respectively from the three other data buses apart from the data bus directly connected to that particular transmitter. Thus in respect of transmitter TX2 the direct connection to that transmitter is from the second data bus while the first, third and fourth data buses are respectively connected to the signal processors $sp_{12}$, $sp_{32}$ and $sp_{42}$ associated with transmitter TX2.

Figure 3:
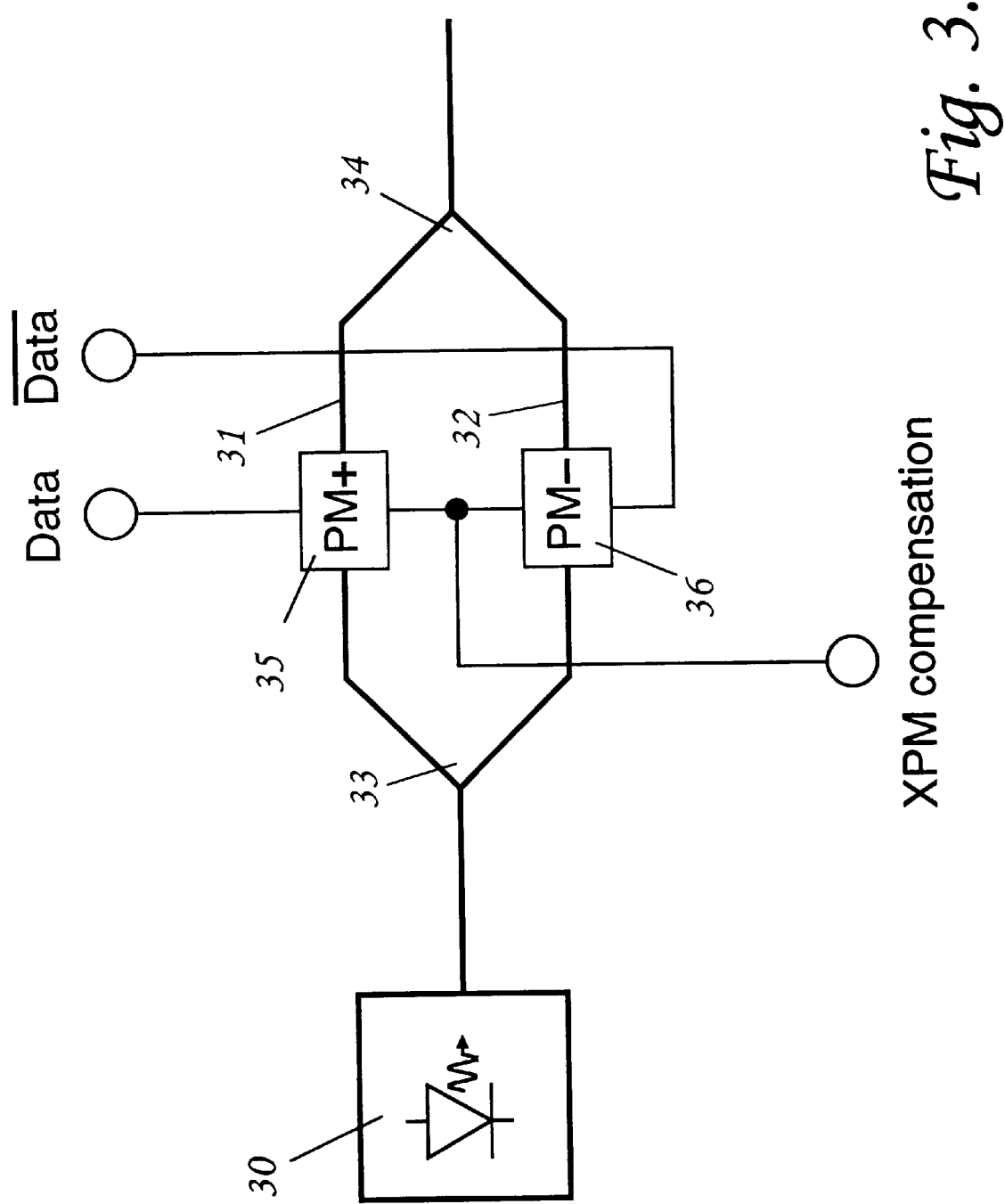
FIG. 3 is a more detailed schematic diagram of an alternative form of combined amplitude and phase modulator for use in the transmitter of FIG. 2.

FIGS. 1 and 2 depict phase modulators 16 as integers separate and distinct from their associated transmitters 10, but in systems in which the transmitters are constituted by optical sources that are operated cw and in which data is impressed by means of a Mach Zehnder modulator having phase modulators in its arms that Mach Zehnder may additionally be arranged to function as the phase modulator after the manner depicted in FIG. 3. The cw operated laser of the transmitter of FIG. 3 is depicted at 30. Its optical emission is coupled into an optical waveguide Mach Zehnder constituted by a pair of interference arms 31 and 32 extending between of pair of 3 db beam splitters 33 and 34 which are arranged back-to-back included in the two interference arms are phase modulators 35 and 36 respectively. The output of the Mach Zehnder is amplitude modulated by applying an electrical data signal to phase modulator 35 while the inverse electrical data signal is applied to phase modulator 36. Phase modulation is obtained by applying a common mode signal equally to both phase modulators.

Each signal processor 21 performs, as required, a filtering function for correction of the impulse response of the appropriate part of cross phase modulation as determined by the differential fibre dispersion. It also includes a variable attenuator/gain element for adjusting the magnitude of its output. It may also include a variable time delay element to ensure that its output has the appropriate phase, but the need for this can be avoided if the complete set-up is laid out in a manner that all the electrical signals applied to the phase modulators 16 are automatically aligned in time.

It has been previously stated that the invention may be viewed as providing a kind of inverse pre-chirping of the individually affected channels to counteract at least some of the chirping they experience as the result of XPM. The form of this inverse pre-chirping is determined by the individual signal processors 16. Thus the signal processor $sp_{21}$ provides an output that when applied to phase modulator PM1 will apply an inverse pre-chirping of the signal emitted by transmitter TX1 using, to compensate for the XPM induced in that emitted signal by the output of the transmitter TX2, a filtered version of the data signal applied to transmitter TX2. Similarly signal processors $sp_{31}$ and $sp_{41}$ compensate for the XPM induced in the signal emitted by TX1 respectively by the outputs of the transmitters TX3 and TX4.

Instead of using the summing amplifier 22 to sum the outputs of the three signal processors $sp_{21}$, $sp_{31}$ and $sp_{41}$, in the electrical regime, applying that electrical regime sum to a single modulator PM1; the sum may be effected in the optical regime by the use of a cascade of three phase modulators (not shown) in the optical output of the transmitter TX1, each of these three phase modulators receiving an electrical input from an associated one of the three signal processors $sp_{21}$, $sp_{31}$ and $sp_{41}$.

The nature of the requisite filtering functions performed by the individual signal processors 16 is determined by application of the theory of XPM. The following equation has been derived for the XPM transfer function.

As the result of the operation of the Kerr effect the propagation of a first amplitude modulated optical signal along an optical waveguide produces a propagating localised modulation of the effective refractive index of that waveguide. If at the same time there is a second optical signal propagating in the waveguide, this modulation of the index provided by the first signal acts to produce a modulation of the phase of the second optical signal at the modulation frequency of the first optical signal. (Similarly, if the second optical signal is also amplitude modulated, it produces its own localised modulation of the index, which in its turn serves to modulate the phase of the first signal).

If there is no dispersion in the waveguide, these two signals will propagate in step with each other, and hence the phase modulation will gradually build up. The rate of build up will decay exponentially due to the effects of optical absorption steadily eroding the signal power. On the other hand, if there is no dispersion there is no conversion of the phase modulation (PM) into amplitude modulation.

Consider an optical wave propagating in an optical waveguide as exp $\iota(\omega t-\beta z)$, where $\beta=2\pi \cdot n_{eff}/\lambda_0$, and where $\lambda_0$, is the free space wavelength of the light, and $n_{eff}$ is the effective refractive index of that light propagating in the waveguide. If that wave launched into the waveguide is now phase modulated at a frequency $\Omega$, and if the waveguide exhibits dispersion, then, after the light has propagated a distance $z_0$, some of that phase modulation will have been converted into amplitude modulation, the PM to AM conversion factor being given by:

$$\sin^2 \frac{\beta'' z_0}{2} \cdot \Omega$$

where $$\beta'' = \frac{\partial^2 \beta}{\partial \omega^2} = \frac{\lambda_0^2 \cdot D(\lambda)}{2\pi c}$$

and where D is the waveguide dispersion (typically measured in units of ps/nm/km).

In the presence of dispersion, the two signals do not remain exactly in step with each other for the full length of the fibre. Under the provisos (normally satisfied in any practical transmission system) that the information bandwidth is much less than the channel spacing, and that the waveguide length, $z_0$, is longer than the non-linear interaction length, it can be analytically shown that the PM depth created in the absence of dispersion, the reduction in PM depth due to walk-off effects, and the PM to AM conversion can be treated independently of one another. Under these conditions dispersion operates to reduce the magnitude of the phase modulation produced by the XPM effect by a certain factor related to the walk-off delay per non-linear interaction length, $\tau_w$, where $$\tau_w = \frac{\Delta\lambda \cdot D}{\alpha}$$

where $\Delta\lambda$ is the channel spacing between the two signals, and where $\alpha$ is the waveguide attenuation. The magnitude of this scaling factor by which the magnitude of the phase modulation produced by XPM is reduced by the effects of dispersion in the waveguide is given by:

$$\frac{1}{1+\iota\tau_w \cdot \Omega}$$

From the foregoing, it may be seen that, if $\tau_w \cdot \Omega$ is small compared with unity, then the amplitude of the phase modulation generated by XPM is not significantly reduced in comparison with that that would have been generated had there been no dispersion. Correspondingly, if $\tau_w \cdot \Omega$ is large compared with unity, then the amplitude of the phase modulation generated by XPM is reduced by a factor proportional to $1/\Omega$. More generally, this scaling factor is recognisable as having, for positive values of $\tau_w$, the same form as the transfer function of a single-pole low-pass filter. Accordingly, for positive values of $\tau_w$, the negative replica of the evaluated XPM-induced phase modulation of channel A by channel B employed for the pre-chirping of channel A by the filtering function of the appropriate one of the signal processors 21 of FIG. 2 can be provided by a single-pole electrical filter constituting part of that signal processor, that single-pole electrical filter having a pole frequency of $\frac{1}{2}\pi\tau_w$.

Figure 4:
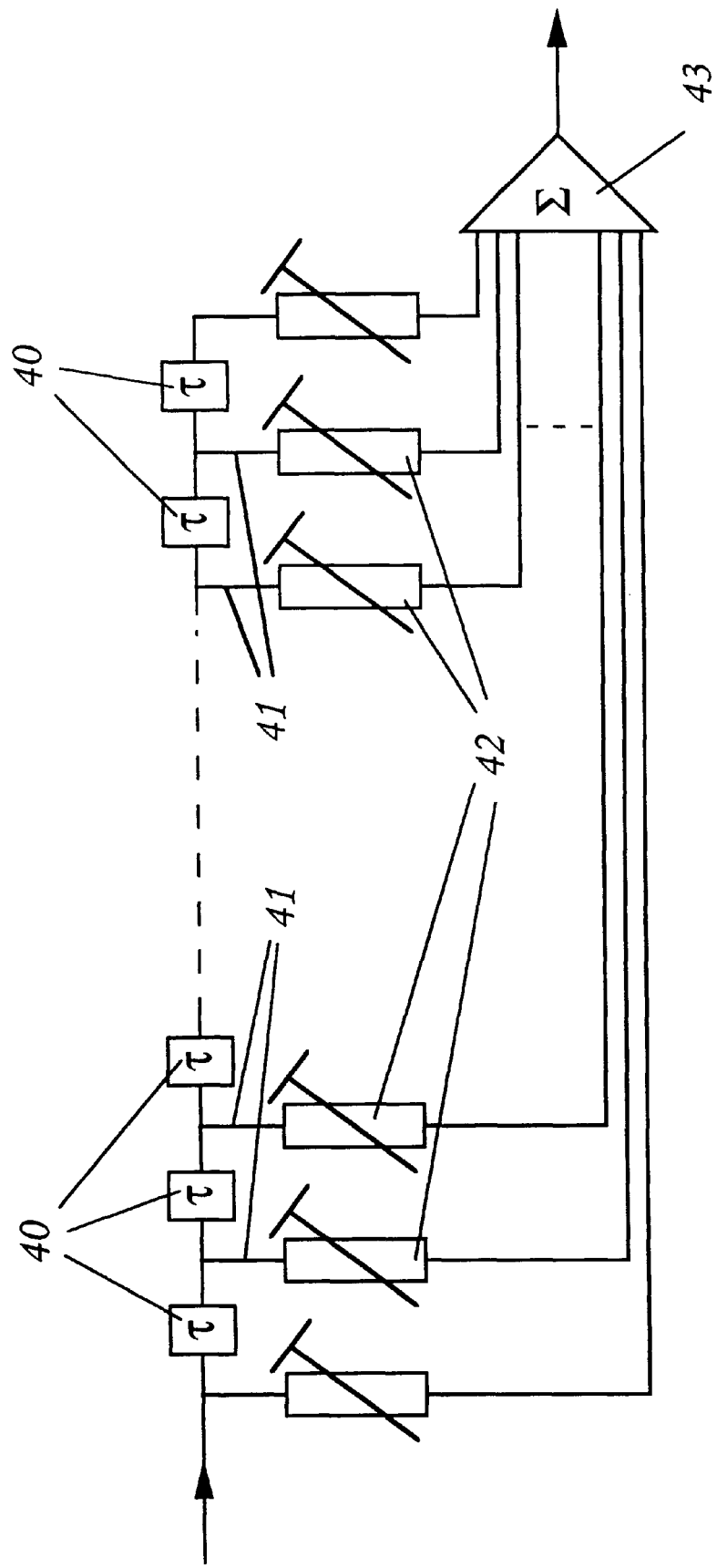
FIG. 4 is a schematic diagram of a transversal filter for use as a component of the transmitter of FIG. 2.

However it will be apparent that, if $\tau_w$ is positive in respect of the XPM induced in channel A by channel B, then $\tau_w$ will be negative in respect of the XPM induced in channel B by channel A. Significantly, whereas for positive values of $\tau_w$, the function $$\frac{1}{1+\iota\tau_w \cdot \Omega}$$

corresponds to the transfer function of a causal single-pole low-pass filter that is simple and easy to implement electrically; for negative values of $\tau_w$, an electrical implementation is liable to involve additional complexity because the filter function is acausal, and may for instance involve a realisation in the form of a transversal filter. Such a transversal filter is schematically depicted in FIG. 4, and comprises a cascade of electrical delay elements 40 with intervening taps 41, whose signals are individually weighted by means of attenuators 42 before those weighted signals are summed in a summing amplifier 43.

There are three different regimes of operation. In a low walk-off regime of operation, a regime in which $|\tau_w \cdot \Omega|$ is small compared with unity, the function $$\frac{1}{1+\iota\tau_w \cdot \Omega}$$

approximates to unity, and so the corresponding signal processors 21 do not have to perform any filtering function, irrespective of whether the walk-off is positive or negative. In a high walk-off regime of operation, a regime in which $|\tau_w \cdot \Omega|$ is large compared with unity, the function $$\frac{1}{1+\iota\tau_w \cdot \Omega}$$

approximates to $1/\iota\tau_w \cdot \Omega$, and so the single-pole low-pass filter, which is suitable for the positive $\tau_w$ condition pre-chirp, affords only marginally inferior performance when used, with inverse data in place of data, for the corresponding negative $\tau_w$ condition pre-chirp. Therefore it is only in the intermediate walk-off regime of operation, a regime in which $\tau_w \cdot \Omega$ is comparable with unity, that a design of filter for one or more signal processors 21 more complicated than that of a simple causal single-pole low-pass filter is called for.

An example of a low walk-off regime system is given by a system operating at 10 Gb/s in the erbium red band, with a pair of channels respectively at 1555.75 nm and 1557.36 nm propagating in conventional DSF (dispersion shifted fibre) with its dispersion zero at 1550 nm, a dispersion slope of 0.075 ps/nm²/km, and an attenuation of 0.22 dB/km. Over the 20 km effective non-linear interaction length, the walk off, $\tau_w$, at channel a separation of 1.61 nm, is about 16 ps, which is small compared with the 100 ps bit period of 10 Gb/s signals.

The walk-off would have been increased if the DSF fibre had been replaced by red-shifted NZ-DSF fibre with its dispersion zero at 1567 nm. In this instance the walk off, $\tau_w$, is about 25 ps.

An example of a medium walk-off regime system is given by a system operating as described in the paragraph relating to the low walk-off regime system, but using blue-shifted NZ-DSF fibre, with its dispersion zero at about 1514 nm, in place of the DSF fibre with its dispersion zero at 1550 nm. In this instance the dispersion is about 3.2 ps/nm/km in the wavelength range of interest, and hence the walk off, $\tau_w$, is about 103 ps.

A doubling of the channel spacing approximately doubles the walk-off values, in which case, while the red-shifted NZ-DSF fibre example now has a walk-off value entering the medium walk-off regime, the blue-shifted NZ-DSF fibre example now has a walk-off value entering the high walk-off regime.

Figure 5:
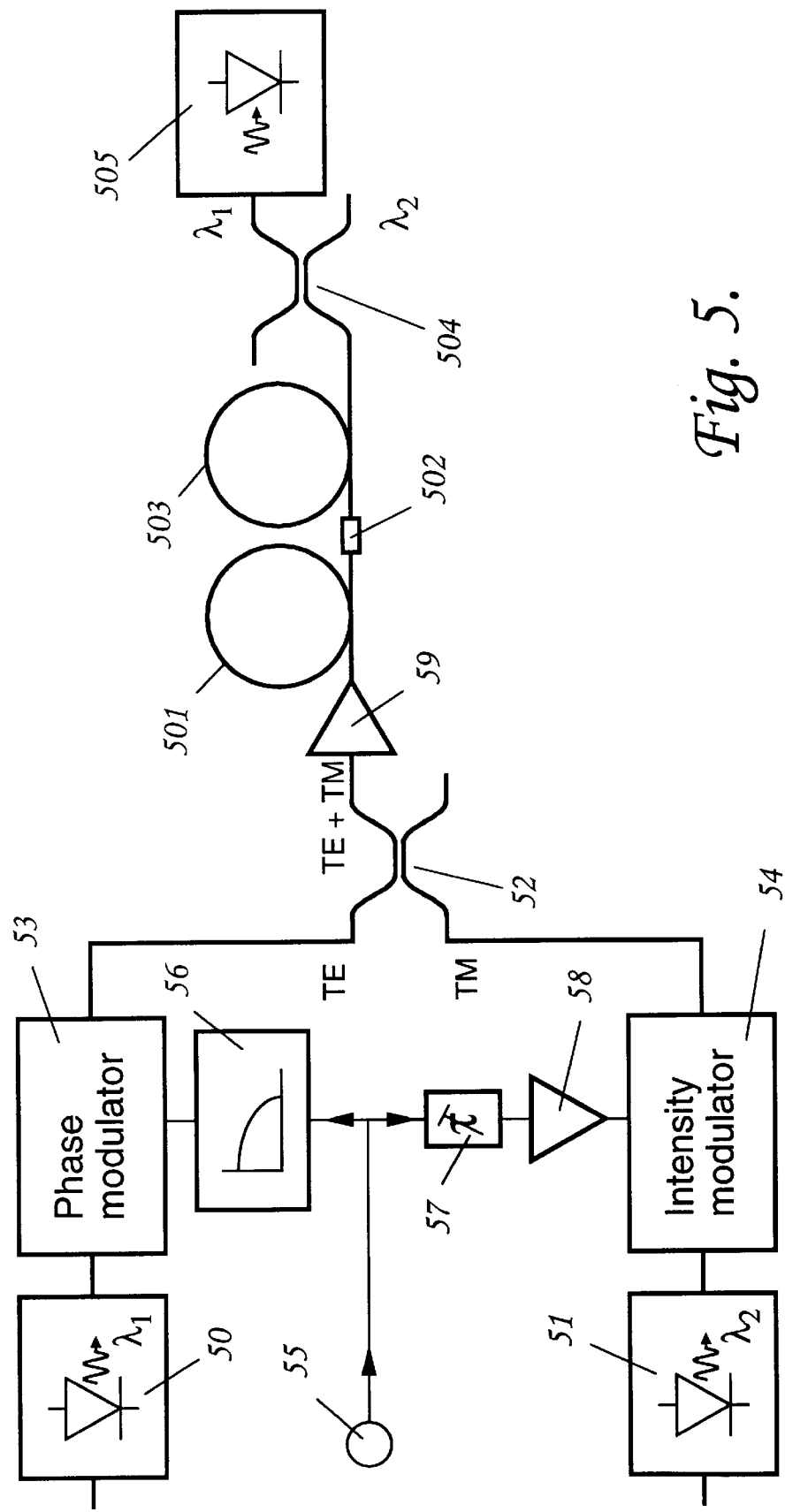
FIG. 5 is a schematic diagram of apparatus employed to test the applicability of the XPM compensation employed in the transmission system of FIG. 1.

The applicability or the analytically derived expressions for the phase modulation generated by XPM, and its compensation by pre-chirping, have been tested by practical experiment using the apparatus of FIG. 5. This practical experiment involved the use of two laser diodes emitting at different wavelengths whose outputs were combined, amplified in a post amplifier, transmitted through a length of fibre simulating the transmission path from a transmitter to a receiver of a typical transmission system, dumultiplexed, and then detected. The output of the second laser was modulated with a particular test waveform simulating data in advance of the combination of the two outputs and, at the detector, the detected signal at the wavelength of the first laser was monitored for the presence of amplitude modulation corresponding to this test waveform. Then the output of the first laser was phase modulated with a signal derived from the test waveform to see to what extent the amplitude modulation appearing at the detector could be cancelled out. For the purpose of this experiment it was found convenient to employ polarisation maintaining fibre from the lasers as far as the post amplifier so that a polarisation beam-splitter could be used for combining the two laser outputs. In a typical transmission system the path from post amplifier to receiver might be constituted by a considerable length of non-zero dispersion-shifted fibre, of which only the initial part, typically less than half of the whole, contributes significantly to XPM, the dispersion of the remainder serving to convert a proportion of the resulting phase modulation into amplitude modulation. For the purposes of this experiment the transmission path is instead formed in two parts, the first part being constituted by shorter length of the non-zero dispersion-shifted fibre long enough for the majority of the XPM to be generated in this fibre, and followed by a second part constituted by a length of dispersion compensating fibre which, on account of its higher dispersion per unit length, effects, in a shorter length of fibre, the same amount of phase modulation to amplitude modulation conversion as would be accomplished using a longer length of fibre with a lower dispersion per unit length. Because the DCF fibre had a smaller spot size than the non-zero dispersion-shifted (NZ-DSF) fibre, a power level which is too small to excite significant XPM in the NZ-DSF fibre may yet be large enough to excite significant XPM in the DCF fibre. Accordingly an optical attenuator was inserted between the two lengths of fibre in order to ensure that the power launched into the DCF fibre did not exceed −3 dBm, and so was insufficient to excite significant XPM in this DCF fibre.

Figure 6:
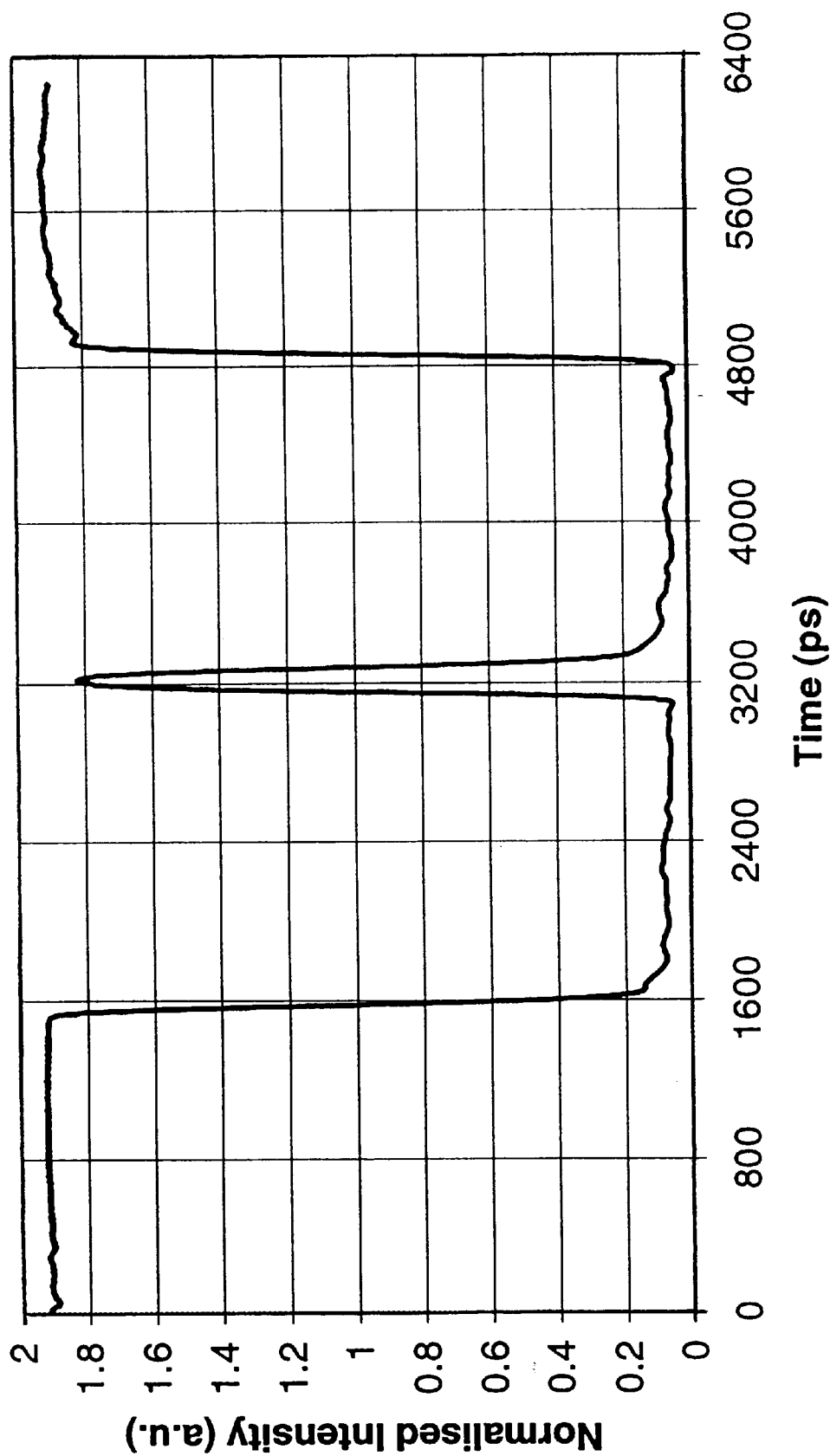
FIG. 6 is a graphical representation of a 64 bit test waveform employed in the apparatus of FIG. 5.

Referring to FIG. 5, the output of a first laser diode 50 operated cw to emit at $\lambda_1$=1554.7 nm is combined with that of a second laser diode 51 operated cw to emit at $\lambda_2$=1556.3 nm using an optical fibre polarisation beam splitter 52. Before the combination of the two laser outputs, the output of the first laser has been transmitted through a phase modulator 53, while that of the second has been transmitted through an amplitude modulator 54. Both modulators derive their modulation signals from an electrical test waveform applied to an electrical input terminal 55. This electrical test waveform applied to terminal 55 is the sequence of 64 bits at 10 Gb/s depicted in FIG. 6 that includes a positive step, a negative step, and a 010 sequence. For the phase modulator 53, this waveform is applied after transmission through a low-pass filter 56, while for the amplitude modulator, this waveform is applied after transmission through the series combination of a phase shifter 57 and an amplifier 58. The combined outputs emerging from the polarisation beamsplitter are fed to a post amplifier 59 from where they are launched first through 40 km of negative dispersion (red-shifted) non-zero dispersion-shifted fibre 501 having a dispersion of −0.41 ps/nm/km, through an optical attenuator 502, and then through a length of dispersion compensating fibre 503 designed for compensating the dispersion of 80 km of standard (non-dispersion-shifted) fibre. At the far end of the dispersion compensating fibre the two combined outputs are demultiplexed using an optical fibre wavelength demultiplexer 504, and the output of the first laser (the output at $\lambda_1$=1554.7 nm) is fed to a detector 505, specifically a digitising oscilloscope.

Figure 7:
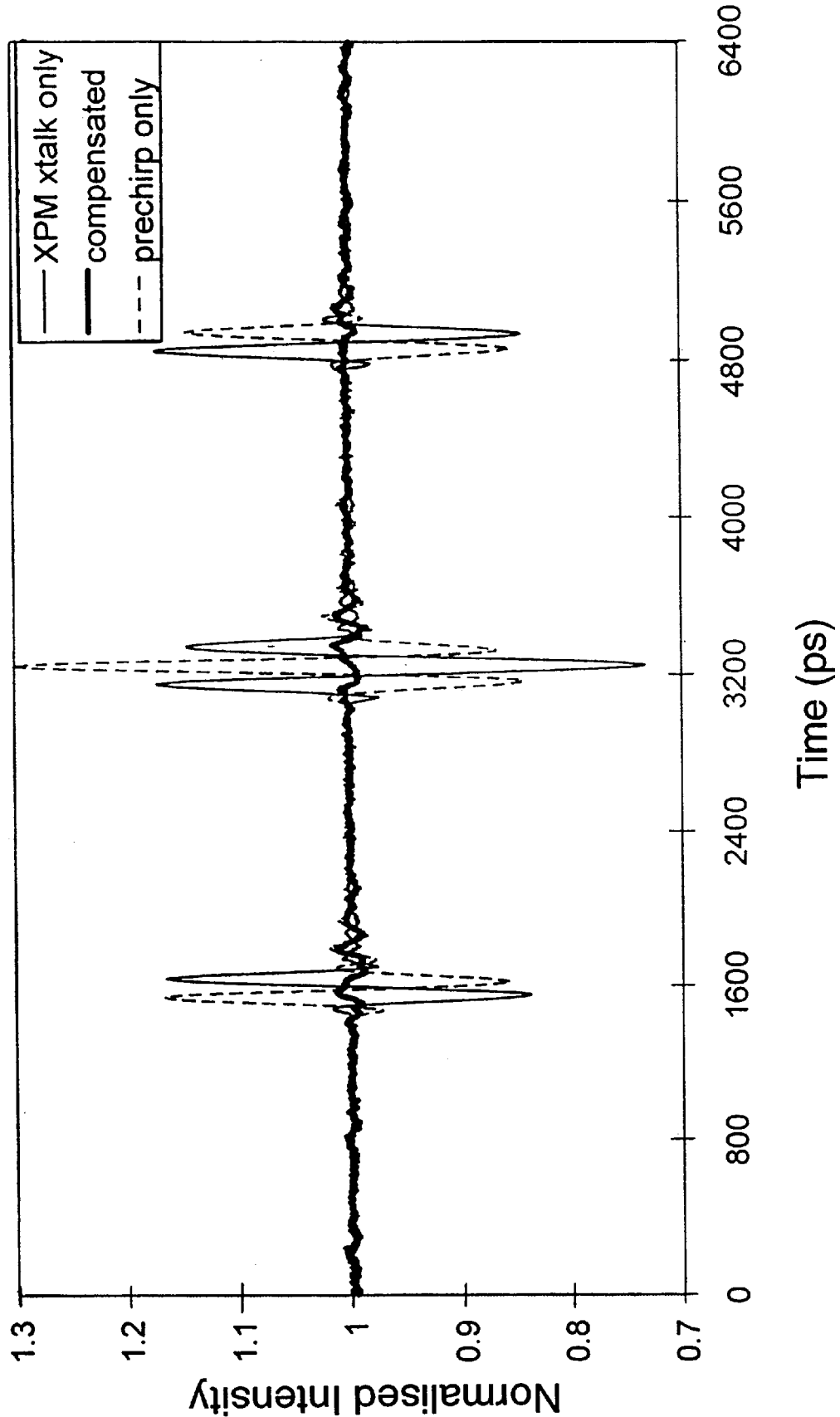
FIG. 7 is a graphical representation of test results obtained using the test waveform of FIG. 6.
Figure 8:
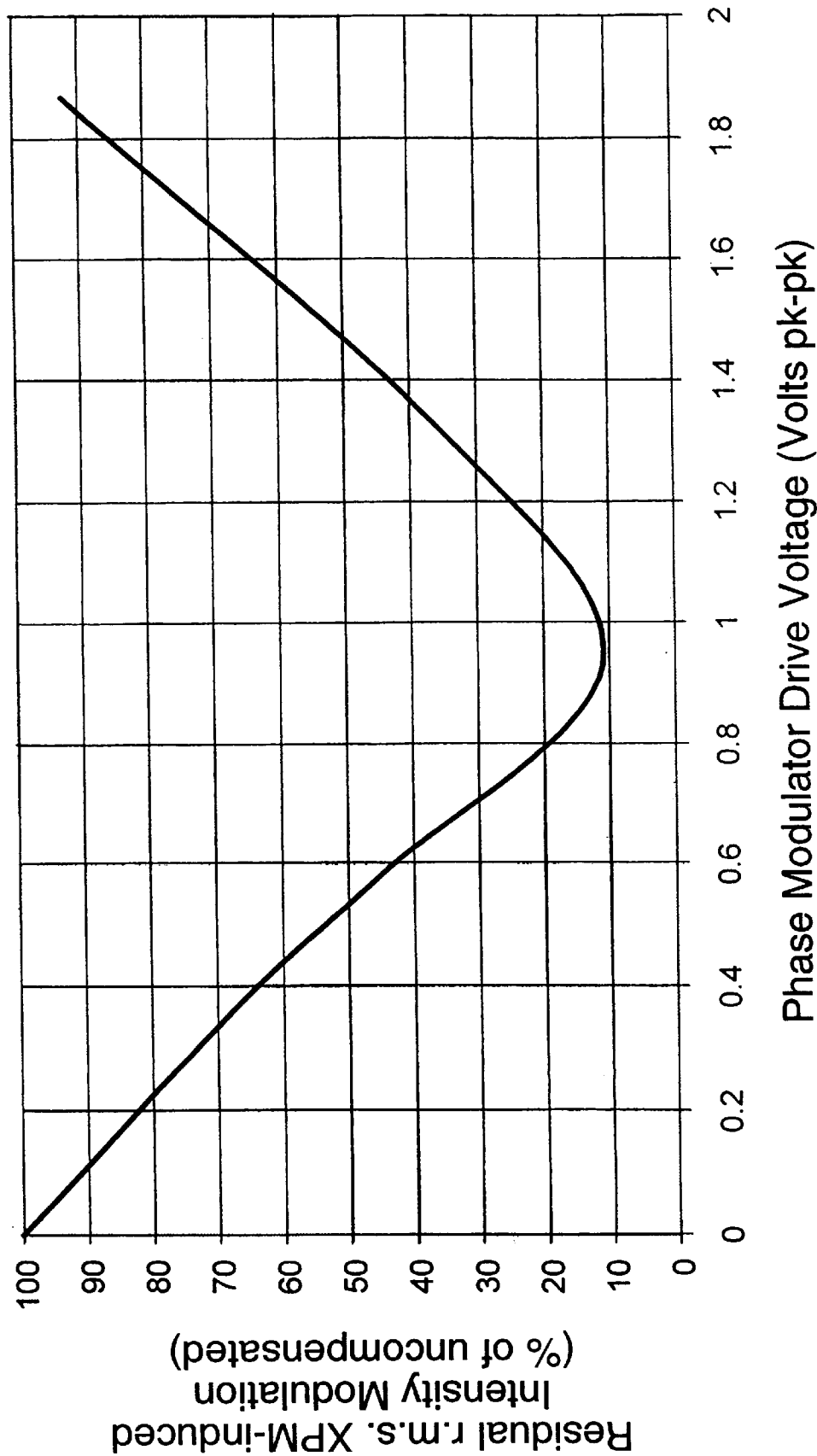
FIG. 8 is a graphical representation showing how the degree of compensation falls away with departure from optimum depth of compensating phase modulation.

The two channels respectively at $\lambda_1$=1554.7 nm and at $\lambda_2$=1556.3 nm have a frequency difference of about 200 Ghz, and for this channel separation, assuming an attenuation of 0.22 dB/km, the dispersion of the non-zero dispersion-shifted fibre 501 provides a pole frequency of $|\frac{1}{2}\pi\tau_w|$ that is higher than the information bandwidth. This means that operation is in the low walk-off regime for which low-pass filtering of filter 56 is not necessary and was not used. The thin solid line trace of FIG. 7 depicts the intensity of the cross-talk detected by the digitising oscilloscope 505 that, in the absence of any phase compensation imparted by modulator 53, appears on the $\lambda_1$ channel as the result of XPM and the subsequent conversion of a significant proportion of that phase modulation into amplitude modulation. Correspondingly, the broken line trace of FIG. 7 depicts, for optimised values of phase delay provided by phase shifter 57 and of gain provided by amplifier 58, the intensity modulation detected by the digitising oscilloscope 505 when the phase modulator 53 is activated, and the amplitude modulator is not (i.e. when the phase pre-compensation is present, but the XPM, for whose effect that pre-compensation is intended to compensate, is itself not present). Finally, the thick solid line trace of FIG. 7 depicts the intensity modulation detected by the digitising oscilloscope 505 when the phase modulator 53 and the amplitude modulator 54 are both activated. The traces of FIG. 7 indicate that, for this low walk-off condition, the r.m.s. value of the XPM-induced intensity modulation has been reduced by the use of compensation to approximately 10% of its uncompensated value. This reduction was obtained with the optimum value of peak-to-peak drive voltage applied to the phase modulator 53. FIG. 8 shows how this reduction falls away on either side of the optimum value of applied peak-to-peak drive voltage.

Figure 9:
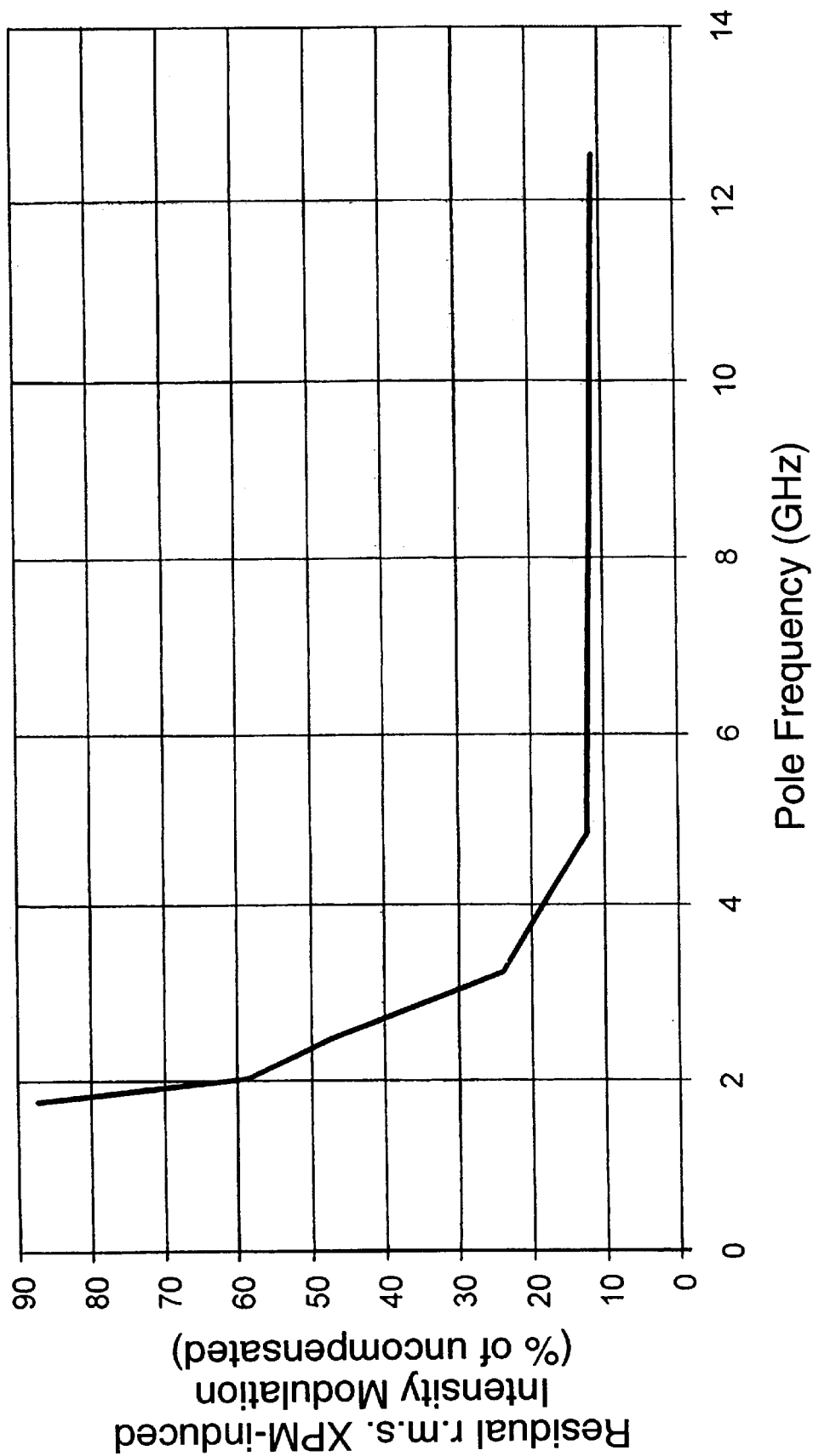
FIG. 9 is a graphical representation showing how the degree of compensation falls away with reducing pole frequency.

Using the same basic configuration of apparatus, the set of optimised XPM-induced intensity modulation reductions graphically depicted in FIG. 9 were obtained for different values of channel separation. Increasing the channel separation has the effect of increasing the walk-off, $\tau_w$, and hence of reducing the pole frequency, $|\frac{1}{2}\pi\tau_w|$, in relation to the information bandwidth. It can be seen from FIG. 9 that the XPM-induced intensity modulation reduction begins to fall away as the pole frequency drops below 5 Ghz ($\tau_w$>32ps). For a channel spacing of 200 Ghz, this corresponds to a requirement that the modulus of the dispersion should, assuming a fibre loss of 0.22 dB/km, be equal to or less than about 1 ps/nm/km.

Attention is now turned to situations in which the walk-off is large enough to make necessary the use of the low-pass filter for achieving a significant XPM-induced intensity modulation reduction factor. Such is the case for instance when the information bandwithis 100 Gb/s and the pole frequency is 2.5 Ghz. For the negative walk-off XPM compensation, the necessary filter can be implemented by a transversal filter of the type previously mentioned with particular reference to FIG. 4. The gain response of such a filter comprising 4 taps separated by tap delays of 100 ps is indicated graphically by means of the thin solid line trace in FIG. 10, which also shows, by means of the thick solid line trace, the ideal response. It is seen from this FIG. 10 that, only within the bandwidth defined by the pole frequency, does the gain response correspond reasonably closely to the ideal response, and that the gain response shows a significant resonance at 10 Ghz, the frequency corresponding to the inverse of the tap delay.

Figure 11:
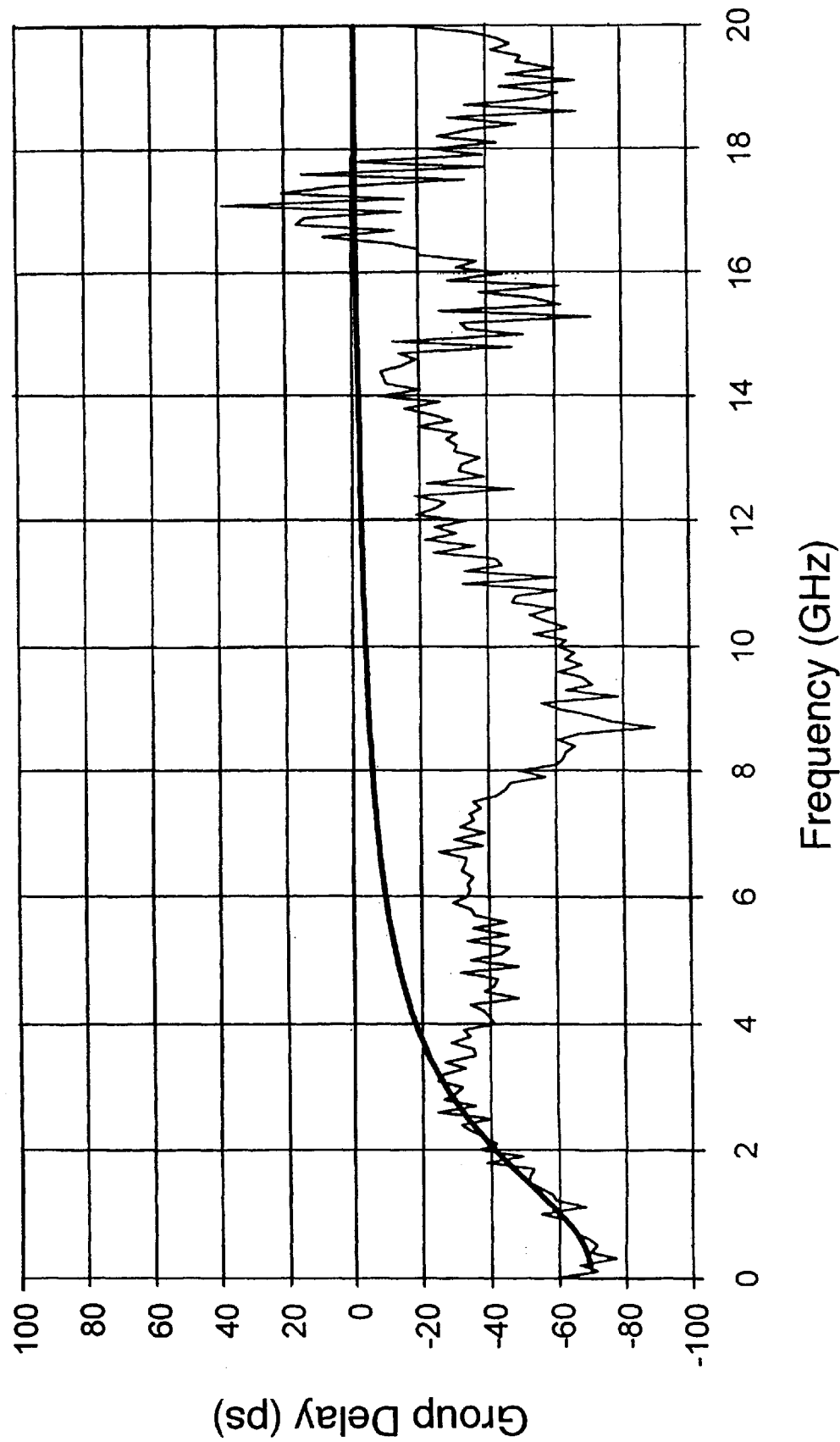
FIG. 11 is graphical representation comparing the group delay performance of the transversal filter of FIG. 9 with the ideal single-pole low-pass filter.

The corresponding group delay response of the 4-tap filter with taps separated by tap delays of 100 ps is depicted by the thin solid line trace of FIG. 11, and similarly the thick solid line trace of FIG. 11 depicts the ideal response. From this FIG. 11 it is seen that, only within the bandwidth defined by the pole frequency, does the group delay similarly correspond reasonably closely to the ideal response.

Figure 10:
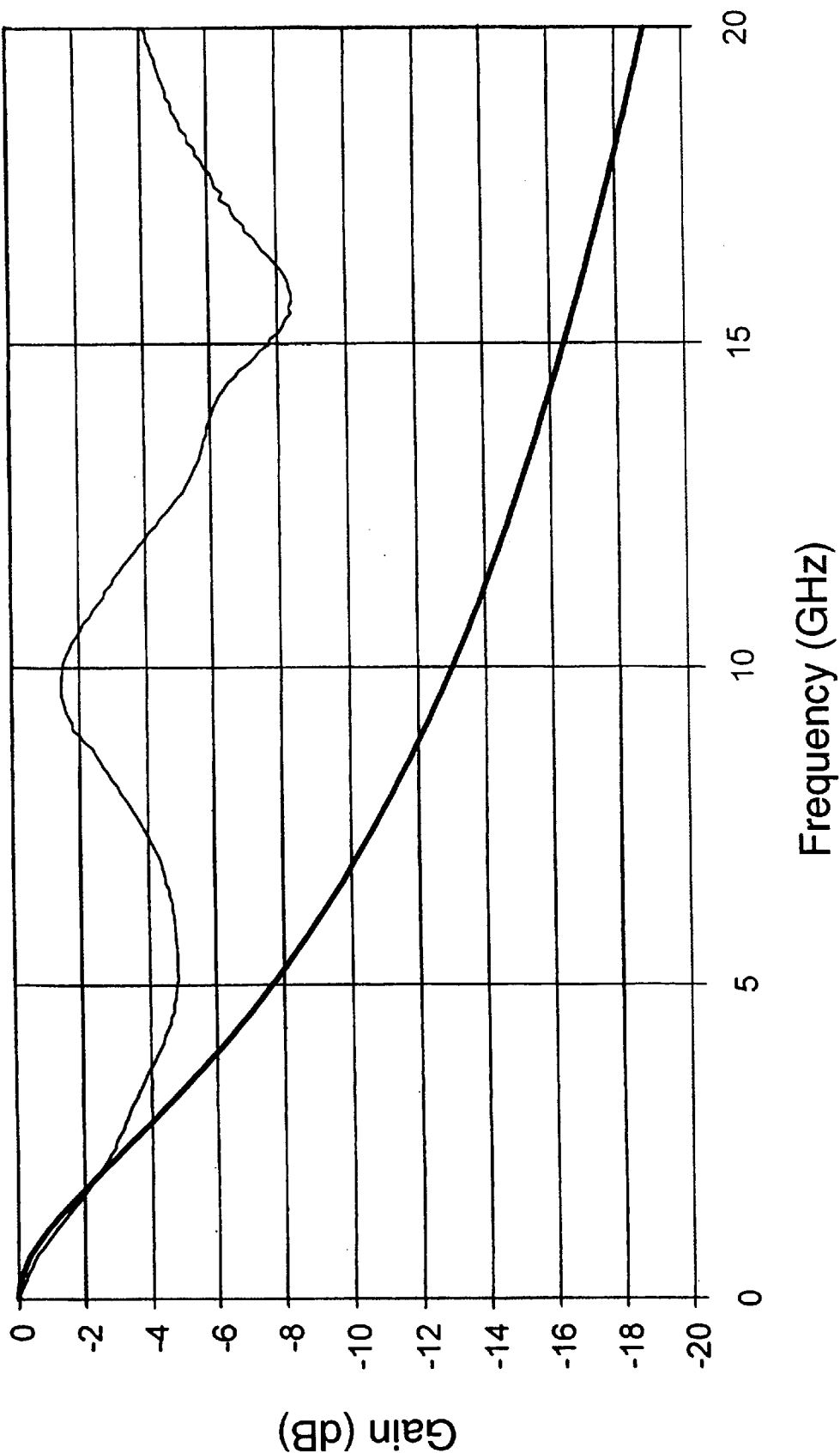
FIG. 10 is graphical representation comparing the gain performance of a 4-tap transversal filter having 100 ps inter-tap delays with the characteristic of an ideal single-pole low-pass filter.
Figure 12:
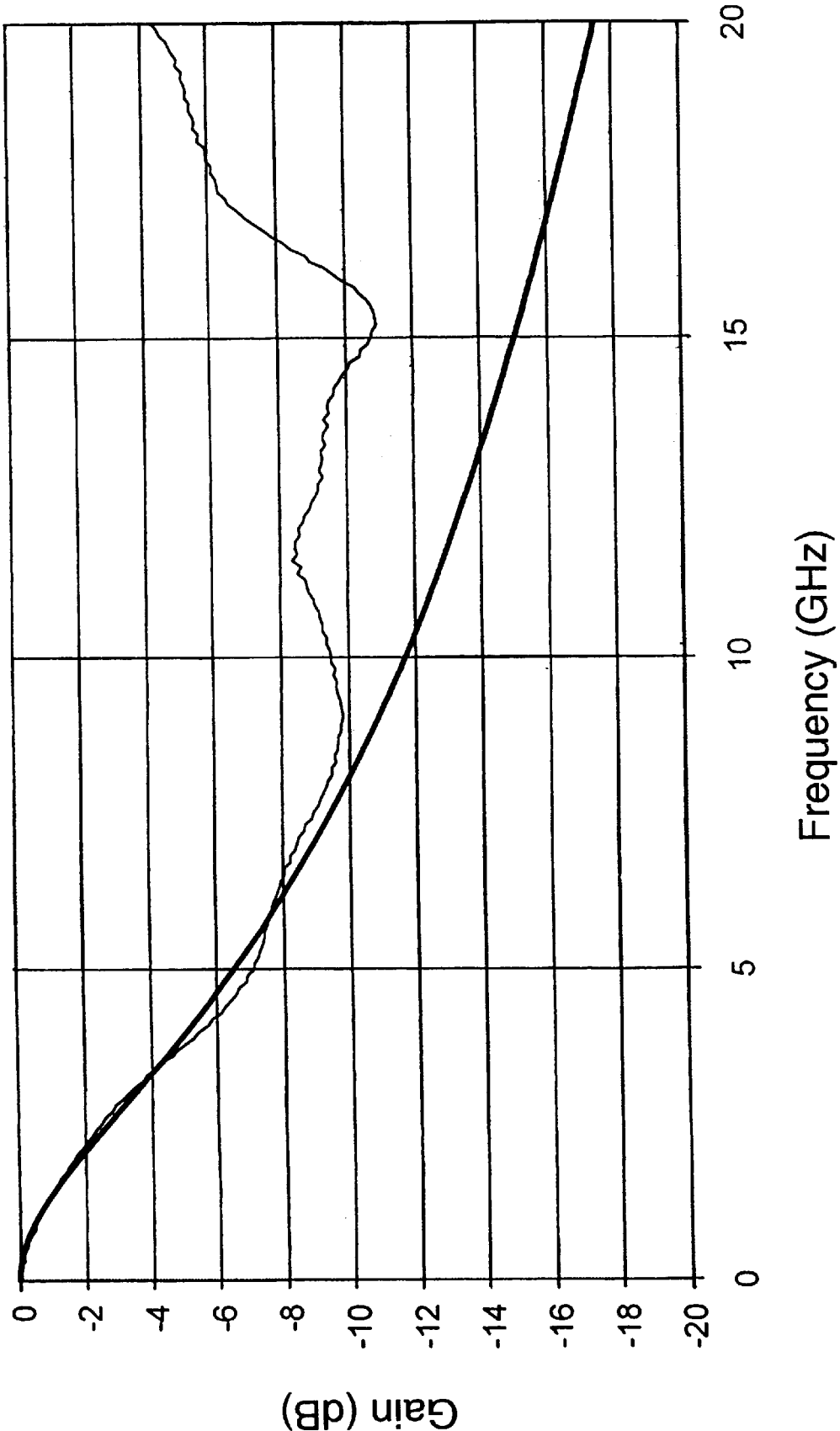
FIGS. 12 and 13 are graphical representations corresponding respectively to those of FIGS. 9 and 10, but in respect of a 4-tap transversal filter having 50 ps inter-tap delays.
Figure 13:
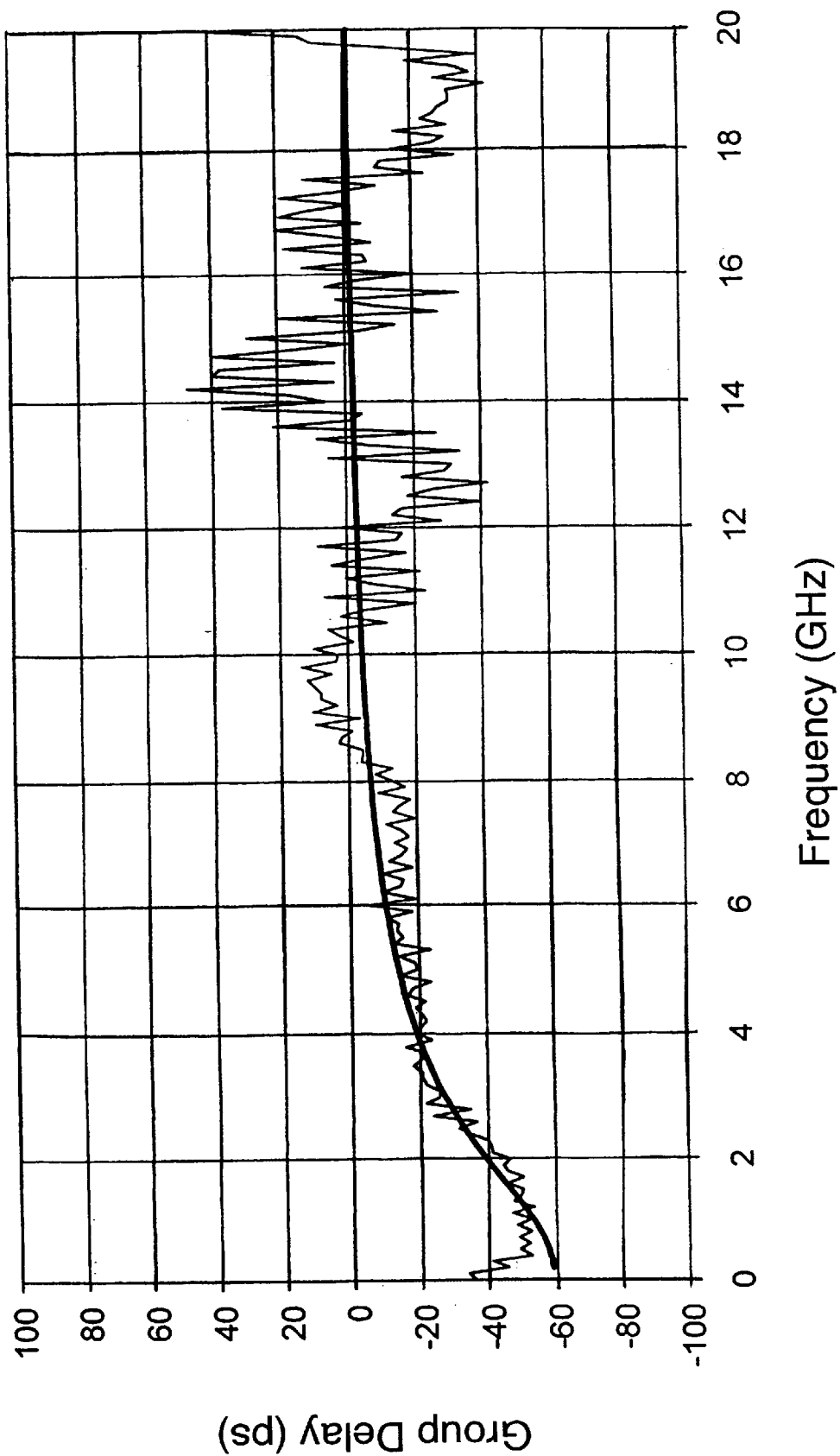

FIGS. 12 and 13 correspond to FIGS. 10 and 11, but are in respect of a 4-tap filter with taps separated by tap delays of 50 ps instead of 100 ps. As might be expected, the actual responses are reasonably close fits to their corresponding ideal responses over a wider bandwidth, but it should be remembered that the filter finite impulse response is now half the length, 150 ps, instead of 300 ps, and so will leave a larger uncompensated 'tail'. Nevertheless the use of the 4-tap filter with taps separated by tap delays of 50 ps was found to reduce the optimised XPM-induced intensity modulation to about 30% of the uncompensated value, whereas the corresponding figure in respect of the filter with 100 ps tap delays is a reduction to about 40% of the uncompensated value. It is expected that the use of more taps should give a further improvement.

Although passing reference has previously been made to self phase modulation, SPM; no previous reference has been made to the prechirping of the optical signals in order to compensate for SPM-induced amplitude modulation that results from the dispersion of the transmission path converting SPM-induced phase modulation into amplitude modulation. It will be evident however from the foregoing treatment the compensation of XPM-induced amplitude modulation that compensation of SPM-induced amplitude modulation can be achieved in substantially the same way. For this purpose additional signal processors 21 specifically signal processors $sp_{11}$, $sp_{22}$, $sp_{33}$ $sp_{44}$ indicated in broken outline in FIG. 2 process data taken from their respective bus lines 20 to provide one further respective input (also shown in broken line) to each of the summing amplifiers 22. Since no walk-off effects occur in SPM, the signal processors for SPM compensation do no need to possess any low-pass filter function, their function is therefore solely to provide the requisite amplitude and delay for the signals they apply to their respective summing amplifiers.

In a transmission system not employing WDM there will, of course, be no XPM for which to compensate, but it may still be found beneficial to compensate for SPM in the manner described above.

What is claimed is:

1. In an optical transmission system having a transmitter having at least two optical channels amplitude modulated by associated electrical signals, which amplitude modulated optical signals are wavelength multiplexed on to an optical transmission path including a length of optical fibre exhibiting dispersion, a method of reducing the level of cross-talk appearing at the end of the fibre remote from the transmitter that is engendered by cross-phase modulation of one of the two amplitude modulated channels by the other, which method includes modulating, at the transmitter, the phase of said one amplitude modulated channel with a signal derived from the electrical modulation used to modulate the amplitude of said other amplitude modulated channel.

2. A method as claimed in claim 1, which method includes modulating at the transmitter, the phase of at least one of the channels with a replica of the electrical modulation used to modulate the amplitude of that channel.

3. A method as claimed in claim 1, wherein the signal derived from the modulation used to modulate the amplitude of said other signal is a replica of said modulation.

4. A method as claimed in claim 1, wherein the signal derived from the modulation used to modulate the amplitude of said other signal is a low-pass filtered replica of said modulation.

5. A method as claimed in claim 4, wherein an electrical transversal filter is employed to generate the low-pass filtered replica.

6. In an optical transmission system having a transmitter having at least two optical channels amplitude modulated by associated electrical signals, which amplitude modulated optical signals are wavelength multiplexed on to an optical transmission path including a length of optical fibre exhibiting dispersion, a method of reducing the level of cross-talk appearing at the end of the fibre remote from the transmitter that is engendered by cross-phase modulation of each of the amplitude modulated channels by each of the other channels, which method includes modulating, at the transmitter, the phase of each one of the amplitude modulated channels with signals derived from the electrical modulation used to modulate the amplitude of each of the other amplitude modulated channels.

7. A method as claimed in claim 6, which method includes modulating at the transmitter, the phase of at least one of the channels with a replica of the electrical modulation used to modulate the amplitude of that channel.

8. A method as claimed in claim 7, wherein the modulation at the transmitter of the phase of at least one of the modulated channels with signals derived from the electrical modulation used to modulate the amplitude of each of the other channels includes modulation of the phase of said at least one of the modulated channels with a replica of the electrical modulation used to modulate the amplitude of one of said other modulated channels.

9. A method as claimed in claim 7, wherein the modulation at the transmitter of the phase of at least one of the modulated channels with signals derived from the electrical modulation used to modulate the amplitude of each of the other channels includes modulation of the phase of said at least one of the modulated channels with a signal that is a low-pass filtered replica of the electrical modulation used to modulate the amplitude of one of said other modulated channels.

10. A method as claimed in claim 9, wherein an electrical transversal filter is employed to generate the low-pass filtered replica.

* * * * *